(12) United States Patent
Yang

(10) Patent No.: US 8,488,021 B2
(45) Date of Patent: Jul. 16, 2013

(54) IMAGE POSITIONING METHOD, POI TAGGING METHOD AND THE APPARATUS

(75) Inventor: De-Wei Yang, Taoyuan County (TW)

(73) Assignee: Altek Corporation, Hsinchu (TW)

( * ) Notice: Subject to any disclaimer, the term of this patent is extended or adjusted under 35 U.S.C. 154(b) by 371 days.

(21) Appl. No.: 12/788,540

(22) Filed: May 27, 2010

(65) Prior Publication Data

US 2011/0032385 A1 Feb. 10, 2011

(30) Foreign Application Priority Data

Aug. 10, 2009 (TW) .............................. 98126743 A

(51) Int. Cl.
*H04N 5/76* (2006.01)
(52) U.S. Cl.
USPC .................. 348/231.1; 348/231.2; 348/231.3; 348/231.4
(58) Field of Classification Search
USPC .................. 348/231.1–231.5, 333.02, 333.05
See application file for complete search history.

(56) References Cited

U.S. PATENT DOCUMENTS

| | | | |
|---|---|---|---|
| 6,657,661 | B1 | 12/2003 | Cazier |
| 2002/0191087 | A1* | 12/2002 | Hashimoto et al. ......... 348/231.3 |
| 2009/0324137 | A1* | 12/2009 | Stallings et al. .............. 382/306 |

* cited by examiner

*Primary Examiner* — Yogesh Aggarwal
(74) *Attorney, Agent, or Firm* — Rosenberg, Klein & Lee

(57) ABSTRACT

An image positioning method, a POI tagging method and an apparatus therefor are described. The method is particularly to define a range corresponding to a positioning value translated by a global positioning system. Further, a point-of-interest (POI) is tagged according to the defined range. In an exemplary example, if there is no positioning signal detected as photographing an image, a previously received positioning signal is used to be the positioning value for the image. According to the preferred embodiment of the tagging method, an image is taken firstly, and then it's to determine a positioning value for the image. In which the positioning value may be determined on the instant of photographing. Alternatively, the positioning value may be retrieved from the image's attribute through playback software. Thereby, a range associated with the positioning value is defined. A corresponding point-of-interest is tagged to the image's attribute afterward.

16 Claims, 6 Drawing Sheets

IMAGE POSITIONING METHOD, POI TAGGING METHOD AND THE APPARATUS

BACKGROUND OF THE INVENTION

1. Field of the Invention

The present invention generally relates to method for defining image positioning value, tagging POI, and the related apparatus, more particularly, it's to utilize a global positioning system to record the position of the image being taken, and accordingly to set a POI.

2. Description of Related Art

Conventionally, diverse functions are developed and incorporated into the digital capturing device such as digital camera and camcorder. A digital camera may be equipped with built-in global positioning system (GPS) chip which is utilized to record the position as taking an image. Meanwhile, the related coordinates information is carried into image attribute, such as the well known Exchangeable image file (EXIF).

While the stored digital image files are getting more as continuously photographing, it becomes enormous and complex to manage the files. Therefore, some conventional arts are developed to provide a good deal of management. The most seen approach is utilizing the date accompanied with the image file as photographing. One of the latest ways is to incorporate the position information retrieved from a global positioning system (GPS) and an electronic map therefor while the image is taken. Those provided approaches will still meet a problem when the system can not receive any GPS signal that results in no any positioning information.

Further reference is made to the table below showing an example of EXIF. This table records the image's attribute including any data, time, and image signals as photographing. Furthermore, a set of coordinates, including the values of longitude and latitude, retrieved via GPS is also recorded, and possibly for another use in the future.

This table shows an example of EXIF:

| Tag | Value |
| --- | --- |
| Manufacturer | Sony |
| Camera Model | Sony T2 |
| X-Resolution | 72 |
| Y-Resolution | 72 |
| Resolution Unit | dpi |
| Date and Time | 2008:10:06 10:23:52 |
| Exposure Time | 0.00800 (1/125) sec |
| F Number | F2.4 |
| Metering Mode | Aperture First |
| ISO | 64 |
| EXIF Version | 30, 32, 32, 31 |
| Date and Time (original) | 2008:10:02 10:18:00 |
| Date and Time (digitized) | 2008:10:02 10:18:00 |
| Exposure Bias (EV+−) | 0 |
| Pixel X Dimension | 1600 pixel |
| Pixel Y Dimension | 1200 pixel |
| GPS Latitude | 24, 17'40.0802" |
| GPS Longitude | 120, 38'33.2314" |
| GPS Elevation | 100.035 m |

The image captured through a digital image capturing device contains the positioning information recorded in EXIF. According to the above table, the positioning information may include GPS latitude and GPS longitude which can be the basis of categorization. Especially the positioning signal obtained through GPS is used to categorize the images, and preferably a specific software application is employed therefor. The relevant technology can refer to U.S. Pat. No. 6,657,661. U.S. Pat. No. 6,657,661 has disclosed a digital camera with GPS enabled file management, and the produced positioning signals are used to file a great quantity of images. The related process is shown in FIG. 1.

The GPS built in the digital camera is adapted to determine the location of the device, including the positioning signal with longitude and latitude (step S102). Through a GPS database, the related name of the location can be recognized, such as the name of city, road or the address (step S104). A compass adopting principle of terrestrial magnetism is used to determine the facing direction of the device (step S106). Those images are stored based on information of the names and directions (step S108), therefore it's convenient to file the images, especially for the great quantity of files.

SUMMARY OF THE INVENTION

In view the conventional EXIF information being the basis to categorize the image files, the present invention particularly considers the problem as the GPS signal cannot be received if the coordinates obtained by the global positioning system is the only information being the basis of filing. An image positioning method, POI (point-of-interest) tagging method and the apparatus therefor are provided. In particular, the positioning value retrieved through the global positioning system while the image is taken is used to determine the range thereto. Based on the determined range, a point-of-interest (POI) is set. A lookup table or a database is incorporated to associate the range and the point-of-interest. In which, the means can be configured by a user, or depending on the need after photographing. However, if no any positioning signal is received as photographing, the provided tagging method uses the last positioning signal to be the positioning value for the taken image. This image is particularly categorized into a specific POI.

One of the preferred embodiments of the image POI tagging method of the present invention is adapted to an image capturing device having a built-in global positioning system. The first step in the method is to retrieve an image. Next, the step is to determine whether a positioning signal is received as taking the image. If the positioning signal is received, it's to define a positioning value in accordance with the positioning signal. Otherwise, if the positioning signal is not detected, the positioning signal received from the last image being taken is used to define the positioning value of the image.

After the positioning value is defined, the further step is to determine a range associated with the positioning value. However, if the positioning value does not appear in any range, the positioning value relating the previous image is used to be tagged into this image's attribute, such as a column in EXIF. If the positioning value is defined to associate with a range, a POI in the range can be determined. The POI is further tagged into the attribute.

The preferred embodiment of the apparatus utilizing the mentioned positioning method and the POI tagging method is applicable to an image capturing device, such as the digital camera. The image capturing device preferably includes an image retrieving unit. The image retrieved by the image retrieving unit is transferred to an image processing unit. After compressing, the image is stored in a memory that is displayed on an image display unit.

The apparatus further has a micro processing unit, which is electrically connected to the image processing unit. After receiving the image signals, an image positioning value is defined by a global positioning unit. Then a position comparison unit is used to define the positioning value and its associated range. A POI is determined consequently.

In one of the objects of the present invention, rather than the positioning value of an image is defined by the micro processing unit as photographing, the positioning value of an image is alternatively defined by the positioning signal of the image being previously taken if there is no any positioning signal is received. Furthermore, this positioning value is written into the image's attribute.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

EXIF of a digital image is usually used to be a basis for categorizing and filing the pictures. In particular, the image capturing device having built-in global positioning system can record the positioning coordinates as taking the picture. The coordinates include the information of longitude and latitude. It is featured that the coordinates can also be the basis for categorizing or filing the pictures if an electronic map is collocate with the coordinates.

Rather than the conventional way to incorporate the coordinates, to be the basis for filing, retrieved from the global positioning system, the present invention further consider the situation as receiving no positioning signal. A method for defining the image positioning value, a POI tagging method, and an apparatus therefor are provided in the present invention. One of the objects of the invention is to define a range associated with the positioning value recorded by the global positioning system when the picture is taken. Furthermore, it is also to introduce the conditions without any positioning signal as photographing.

For example, the indoor photographing may cause the GPS unworkable, or the system meets the abnormal condition, that may make the image capturing device receive no signal. The last received positioning signal will be the positioning value for the picture under the mentioned conditions in accordance with the embodiment of the present invention. Next, the positioning value is also used to define an associated range. Based on the defined range, a corresponding point-of-interest can be determined. In an exemplary example, a lookup table or a database is introduced to record the corresponding information. The POI may be recorded in the image attribute, such as the table in EXIF, which is used to be the basis for categorizing or filing the pictures. According to the preferred embodiment, the categorizing scheme provides a better way to arrange the condition that caused by the multiple positioning points associated with only one location.

Figure 1:
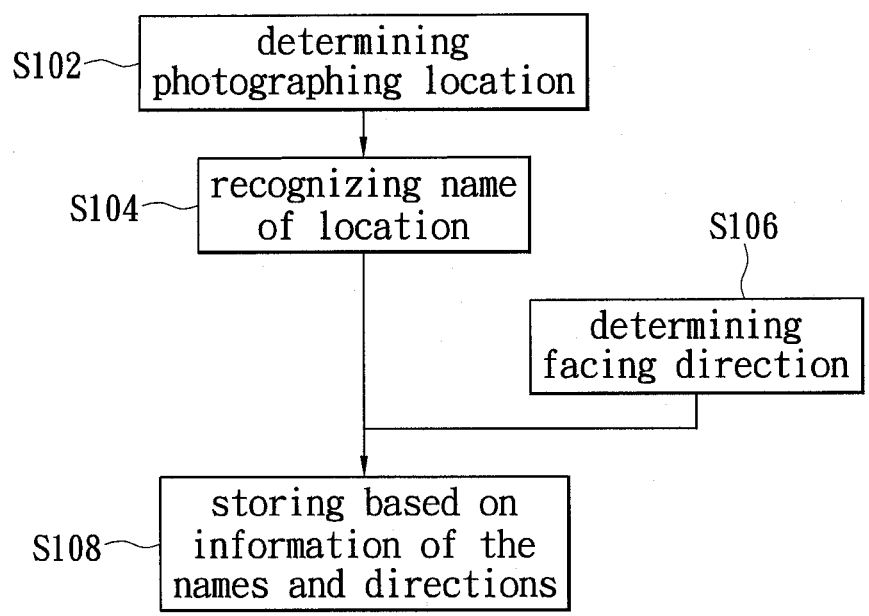
FIG. 1 shows a flow chart of filing the pictures utilizing the position information as photographing in the conventional art.
Figure 2:
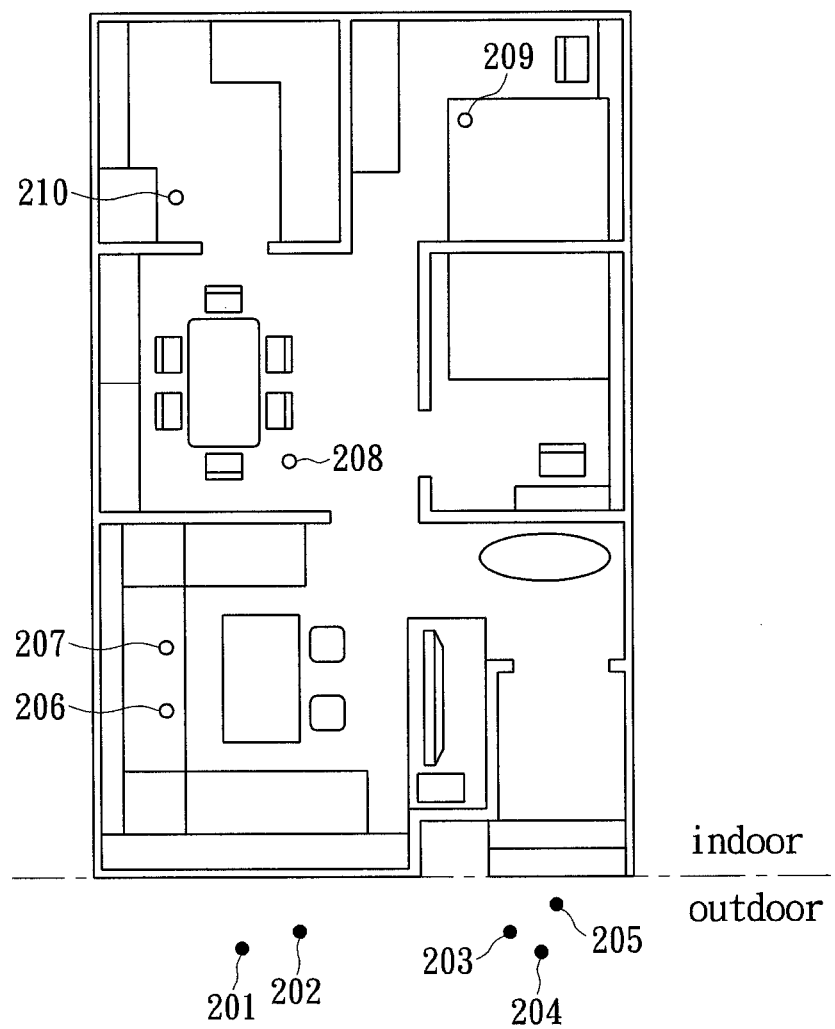
FIG. 2 shows a schematic diagram of tagging the POI for the image as no any positioning signal is receive in the present invention.

Reference is made to FIG. 2 showing a schematic diagram of the embodiments of the present invention. The diagram shows the example of tagging the point-of-interest when no positioning signal is received. The GPS is functioned to retrieve the positioning signal issued by an artificial satellite. So that, the positioning signal may not be received as at indoor or the signal is blocked, or even the signal is interfered under a bad weather. It still exists bad positioning ability even though the conventional art can adopt other auxiliary positioning schemes, such as positioning using mobile signaling or wireless network signals.

The diagram shows a plan including the indoor and outdoor locations. The solid spots indicated by numerals 201 through 205 represent the outdoor locations for photographing. Further, the blank spots numbered as 206 through 210 represent the indoor locations. Regarding spots 201 through 205, the relevant positioning signals can be successfully received in common case when the pictures are taken outdoors. Those signals will be recorded in the image's attribute. However, the indoor photographing may not easily receive the positioning signal propagated from satellite, such as the blank spots.

The present invention is directed to a method for defining the image positioning value when the related positioning signal can or cannot be received. The invention is also directed to a method for tagging point-of-interest, and an apparatus therefor. After that, a range associated to the positioning point can be defined. A point-of-interest is further tagged accordingly for further utilizations, for example, users may easily browse, categorize and file the images. In practical, playback software can be used to categorize the digital images in accordance with the POIs in their attributes. The POI is not only the name of location, but also a special name that can be configured as meaningful to the user. For example, a geographic range can be set as "my home", "the place for first love", or "job location". Those examples are more flexible and recognizable.

Additionally, since every positioning signal is covered by a certain range, the positioning may have inaccuracy even though the picture is taken at the same location. On the one hand, the picture taken at the same location may receive variant positioning point that causes difficulty as to process categorization. In view of these difficulties, the POI tagging method of the present invention is to conclude the positioning points covered by a certain range as one point, by which the pictures are categorized or filed in accordance with the one point.

Furthermore, the processes for recording the positioning point, defining the range, and tagging the POI are installed in the image capturing device. The processes are performed as photographing. Alternatively, those processes can be performed after transferring the pictures to storage medium of a computer system. Afterward, the specific playback software is used to categorize and file the pictures.

Figure 3:
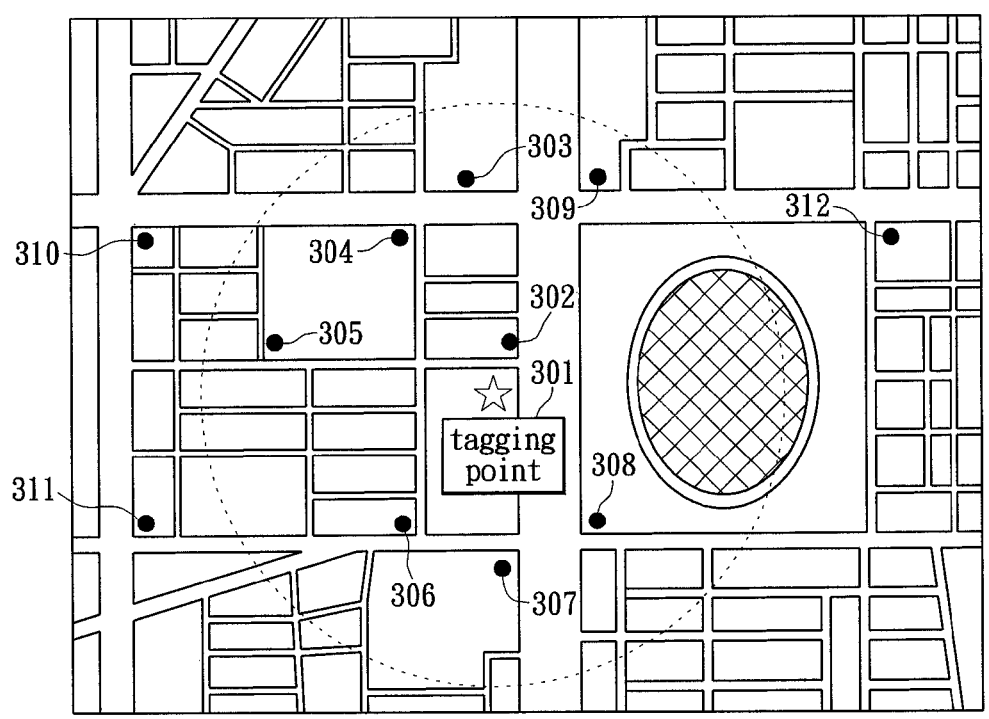
FIG. 3 shows a schematic diagram of setting a range associated with the positioning value in the present invention.

Reference is made to FIG. 3 depicting a schematic diagram of a range associated with the positioning point in accordance with the present invention. The diagram shows an electronic map having a plurality of positioning points marked with 302 to 312. The range framed by a round dotted-line is the user-defined range 30. A tagging point 301 is then configured to represent the positioning point of the range 30.

Figure 4:
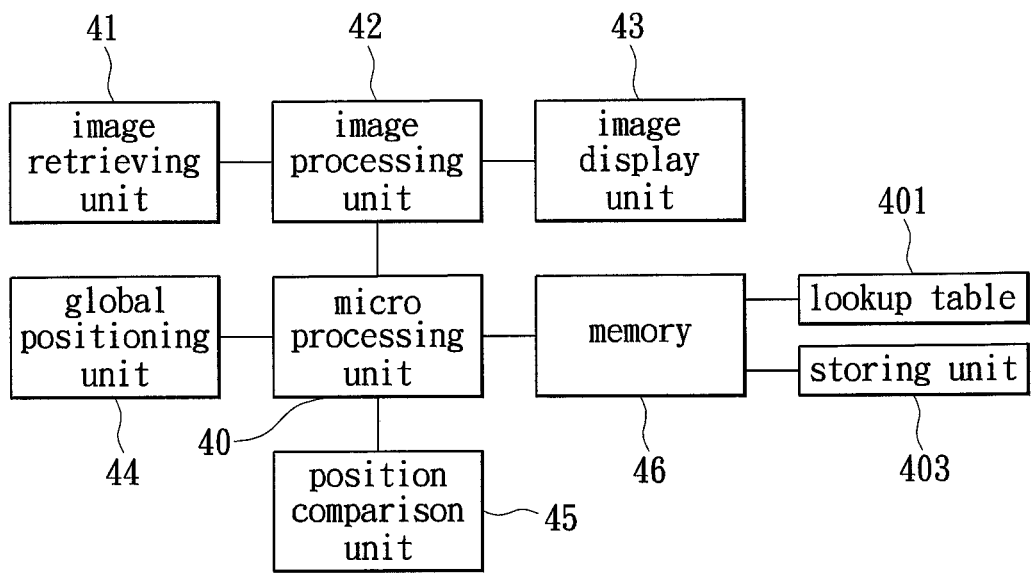
FIG. 4 is a block diagram of the apparatus adapting a method for positioning the image, a POI tagging method, and an apparatus therefor in accordance with the present invention.

Such as the tagged positioning points 302 through 312, the points 302 to 309 are framed in the range 30. Meanwhile, when a picture is taken in the range 30, the firmware inside the image capturing device will immediately conclude the positioning point of the picture as the tagging point 301, the POI of range 30. According to another embodiment, the playback software is afterward to define the POI and file the image in accordance with the related attribute after transferring the image into computer system. With respect to the positioning points 310 through 312 outside the range 30, the image therein is categorized as "Others" simply based on the image's coordinates if there is no any relevant range or POI to be defined, For accomplishing the above described objectives, the block diagram of an apparatus employing the methods for defining the image positioning value and tagging the POI is referred to FIG. 4. One of the preferred embodiments is applicable to an image capturing device, such as a digital camera.

The mentioned image capturing device has an image retrieving unit 41 for retrieving images, in which a set of lens and image sensor are included. After the image is taken, the image signals are transferred to an image processing unit 42 which is electrically connected with the image retrieving unit 41. The signals are then stored in a memory 46 after compression, and furthermore, the image can be instantly shown in an image display unit 43 as photographing.

The device further includes a micro processing unit 40 electrically connected with the image processing unit 42. After capturing the image, a built-in global positioning unit 44 determines the related image positioning value, including a positioning value relating the positioning signal. More particularly, the GPS also provides the previous positioning value to be the representative value of the location since the current positioning signal is not yet received. Next, a position comparison unit 45 is used to define a range associated with the positioning value, and the corresponding point-of-interest.

In the procedure of defining the positioning value for the location as photographing, the micro processing unit 40 defines the positioning value as the related positioning signal is received. Alternatively, the micro processing unit 40 is to define the positioning value for the image by searching the latest positioning signal as previously photographing if no any GPS signal is received. That is, the previous positioning signal is configured to be the positioning value for the image.

Normally, the GPS is always on-line, and periodically detects the position of the image capturing device. Therefore, the latest positioning signal for the previously taken picture can be used to be the positioning value for the later-taken picture. The present invention particularly assumes that the photographing locations are approximate within a certain period. Thus, it is determined that the locations are approximate since the difference may be between the indoor (without positioning signal received) and outdoor.

After that, the defined positioning value is written into the image attribute, and the associated range is used to set a POI. In some cases, the POI may be recorded into the image attribute. Therefore, the inaccuracy existed between the positioning points can be excluded. Furthermore, the POI may be configured as a meaningful name, which is a more convenient to be a basis for categorizing or filing.

All the above-described image signals, positioning signals, the ranges, and the POIs can be recorded into the memory 46 (such as the storing unit 403) of the image capturing device.

The relationship between the positioning points and the associated ranges can be recorded in a lookup table 401. More, the ranges and the corresponding POIs can be produced by a specific software program, but also searched from the lookup table 401. Therefore, the POI can be instantly determined as photographing.

Figure 5:
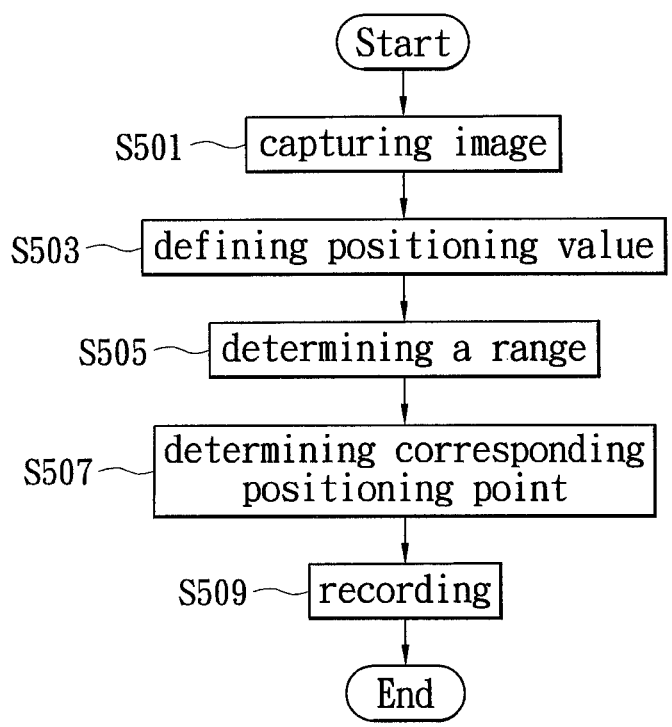
FIG. 5 depicts a flow chart of the embodiment of the image POI tagging method in accordance with the present invention.

Reference is made to FIG. 5 showing a flow chart in accordance with one of the embodiments of the present invention.

In the beginning step S501, an image capturing device retrieves the image signals which are probably accompanied with the positioning signals or not. The image-related positioning value can be defined by means of the claimed scheme under both situations with or without positioning signals (step S503). Accordingly, the step S505 is to define an associated range. After that, a POI with corresponding positioning point is determined (step S507). The information of POI is then recorded in the image attribute (step S509). The values written into one image attribute may have the positioning value. A user can afterward modify the range and POI, and then define a new POI.

Figure 6:
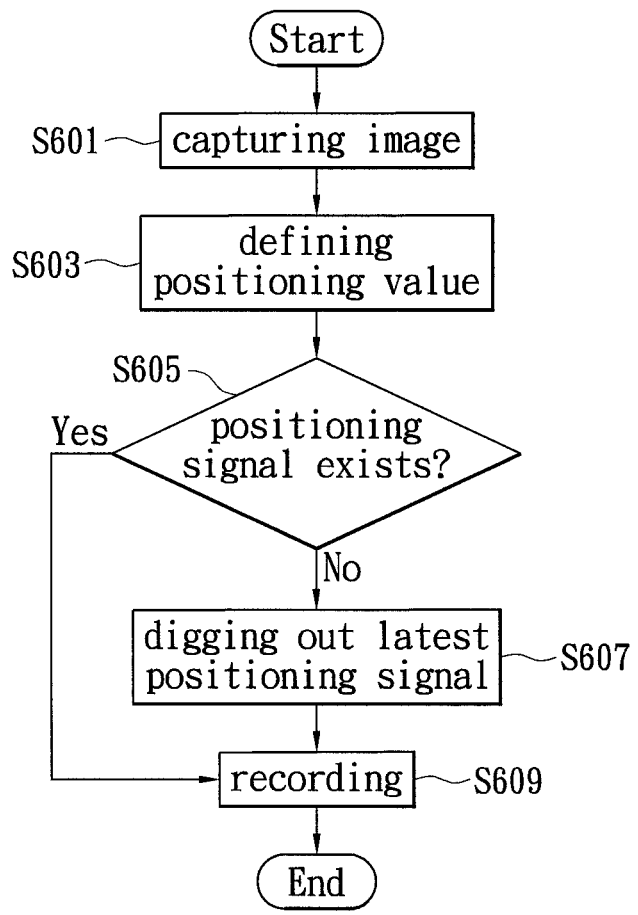
FIG. 6 depicts a flow chart of a method of defining the positioning value of an image in accordance with the present invention.

The steps for defining the positioning value are referred to FIG. 6 showing the embodiment of claimed flow chart. One of the preferred embodiments is applicable to an image capturing device.

In the beginning, such as step S601, an image is captured. Next, a positioning value is defined as photographing (step S603). The method is then determine whether a positioning signal is received or not in step S605. If a global positioning system built in the image capturing device does not receive any positioning signal (step no), the latest positioning signal accompanied with the previously taken image (or the previously image with received positioning signal) is dug out (step S607). The latest positioning signal is to be the positioning value for the image taken currently. The value is then recorded into the image attribute. In which, this positioning signal can be retrieved from the positioning value of the previously-taken image.

Or, the positioning signal can be introduced from the previous positioning signal which was periodically detected by the global positioning system (step S609). In the flow chart, if a positioning signal is received currently (step yes), this signal is used to be the positioning value for the taken image, and directly recorded into the attribute (step S609).

Figure 7:
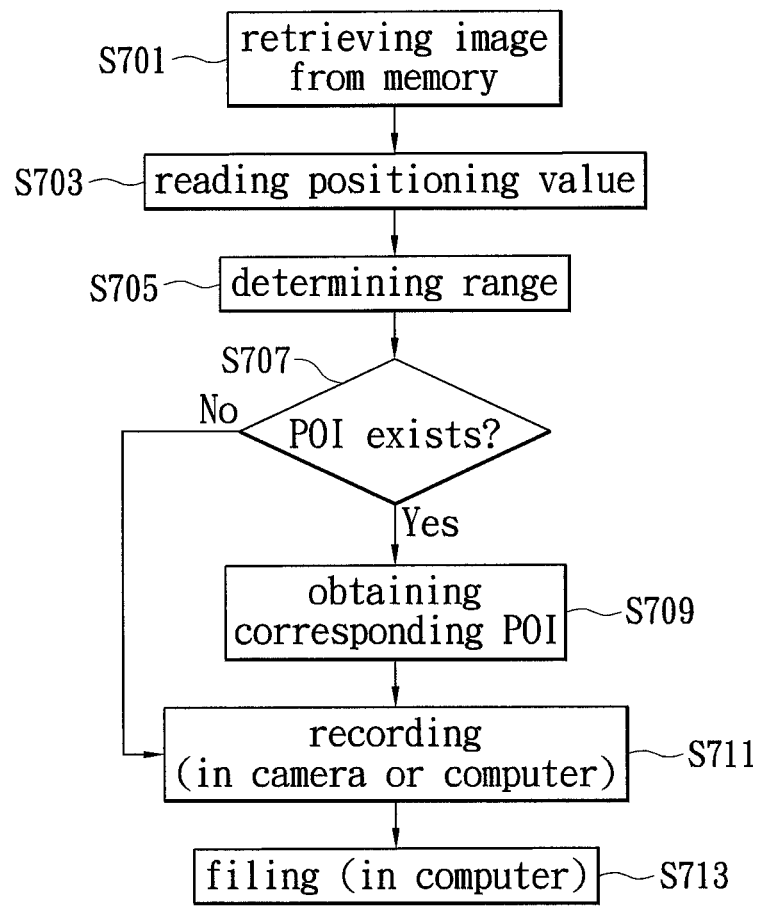
FIG. 7 depicts a flow chart of the embodiment of the image POI tagging method in accordance with the present invention.

After determining the positioning value, the flow chart of tagging POI shown in FIG. 7 is processed. According to the preferred embodiment, the method is performed inside the image capturing device. Alternatively, the method of tagging POI can be performed by one proprietary playback software.

Such as the beginning step S701, an image is retrieved from a memory. The memory can be the buffer memory inside the image capturing device, or a memory card, or any other computer storage medium. After that, the positioning value is read out from the memory (step S703). The way to define the positioning value can be referred to the steps described in FIG. 6.

Next, a range associated with the positioning value is defined (step S705). If the determined positioning value does not belong to any specified range, the positioning value is directed recorded into the image attribute, such as EXIF. If a range with corresponding the positioning value is defined through a lookup table, or in comparison with the content in a database, the method is then to determine whether any POI can be configured or not. Similarly, the lookup table or database is utilized to define any POI associated with the range (step S707).

If there is no pre-defined POI (no), the image signals are directed stored into the memory of the image capturing device, or the storage medium of computer (step S711). After that, it is to perform the categorization or filing in the computer (step S713).

On the one hand, if a POI is defined (yes), the corresponding POI is obtained (step S709). The POI is then tagged into the image attribute. Then the image is stored in the memory of image capturing device (the camera) of the storage medium of computer (step S711). The task of categorization or filing can be performed in the computer afterward (step S713).

To the summary of the above description, the present invention provides a method for defining the image positioning value, a method for tagging the POI, and an apparatus using the methods. More particularly, a range associated with a positioning value is defined after determining the positioning value of a taken image. A POI is then defined accordingly, and the POI and the name can be the basis for further categorization or filing.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A point-of-interest tagging method for an image, comprising:
    capturing an image;
    defining a positioning value of the image;
    determining a range associated to the positioning value;
    setting a coordinate for marking the determined range, and a point-of-interest is generated by referring to the coordinate values; and
    tagging the point-of-interest of the associated range into the image's attribute.

2. The method of claim 1, wherein the image is retrieved from the images taken by an image capturing device.

3. The method of claim 2, wherein the image capturing device utilizes a built-in global positioning system to detect the position of the device within a certain time periodically.

4. The method of claim 1, wherein the image is a file stored in a storage medium after photographing, and the positioning value is read from attribute of the image retrieved from the storage medium.

5. The method of claim 4, wherein the point-of-interest tagging method is performed by image playback software which retrieves the image, reads out the positioning value, and determines the range and its corresponding point-of-interest.

6. The method of claim 1, wherein the steps before the step of defining a positioning value of the image comprise:
    determining whether a positioning signal associated with the image is identified or not;
    defining the positioning value in accordance with the positioning signal associated with the image being taken if the positioning signal is identified; or
    defining the positioning value in accordance with the positioning signal associated with the previous taken image if the positioning signal is not identified.

7. The method of claim 6, wherein the positioning signal is produced by a global positioning system which is disposed in an image capturing device and used to detect the position of the image capturing device periodically, in order to define the positioning value.

8. The method of claim 1, further comprising a lookup table which records the coordinate values and their corresponding points of interest.

9. A point-of-interest tagging method for an image, comprising:
    (a) capturing an image;
    (b) determining whether the image includes a positioning signal or not when the image is captured, wherein:
        (i) defining a positioning value of the image in accordance with the positioning signal being retrieved if the positioning signal is identified;
        (ii) or defining a positioning value of the image in accordance with the positioning signal being retrieved from the previous taken image if the positioning signal is not identified;
    (c) determining a range associated with the positioning signal, wherein:
        (i) tagging the positioning value into the image's attribute if the positioning value is not located in any range;
        (ii) determining a point-of-interest corresponding the range if the positioning value is located in the associated range; and
    (d) tagging the point-of-interest into the image's attribute.

10. The method of claim 9, wherein the step of capturing the image is made by an image capturing device.

11. The method of claim 10, wherein the image capturing device utilizes a built-in global positioning system to detect the positioning signal in a certain time periodically for defining the positioning value.

12. The method of claim 10, wherein the image is a file stored in a storage medium after photographing, and the positioning value is read from attribute of the image retrieved from the storage medium.

13. The method of claim 12, wherein the method is performed by image playback software which retrieves the image, defines the positioning value, and determines the range and its corresponding point-of-interest.

14. The method of claim 10, further comprising a set of coordinate values used to mark the range after determining the positioning value, and the point-of-interest is generated by referring to the coordinate values.

15. The method of claim 14, further comprising a lookup table which records the coordinate values and their corresponding points of interest.

16. An image capturing device performing the point-of-interest tagging method for an image as claimed in claim 1, wherein the device comprises:
    an image retrieving unit for capturing the image;
    an image processing unit electrically connected to the image retrieving unit, wherein the image is compressed through the image processing unit and stored in a memory;
    an image display unit electrically connected with the image processing unit for displaying the image;
    a micro processing unit electrically connected with image processing unit for receiving the image processed by the image processing unit, and used to define a positioning value;
    a global positioning unit electrically connected with the micro processing unit for detecting the positioning value when the image is taken, and detecting the position of the image capturing device periodically in order to define the positioning value; and
    a position comparison unit electrically connected with the micro processing unit for defining a range in accordance with the positioning value, and obtaining a point-of-interest associated with the range by a comparison with a lookup table;
    wherein if the positioning value is not identified as photographing, the micro processing unit retrieves the positioning signal associated with the previous taken image, and writes the positioning value into the image's attribute.

* * * * *